United States Patent
Chang et al.

(10) Patent No.: US 9,893,841 B2
(45) Date of Patent: Feb. 13, 2018

(54) WIRELESS SIGNAL RECEIVER WITH MAXIMUM LIKELIHOOD DETECTOR

(71) Applicant: REALTEK SEMICONDUCTOR CORPORATION, Hsinchu (TW)

(72) Inventors: Chung-Yao Chang, Hsinchu County (TW); Chuan-Hu Lin, Changhua County (TW); Yi-Syun Yang, Kinmen County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/465,249

(22) Filed: Mar. 21, 2017

(65) Prior Publication Data

US 2017/0317788 A1 Nov. 2, 2017

(30) Foreign Application Priority Data

May 2, 2016 (TW) .............................. 105113637 A

(51) Int. Cl.
*H04L 1/00* (2006.01)
*H04L 5/00* (2006.01)
(Continued)

(52) U.S. Cl.
CPC .......... *H04L 1/0054* (2013.01); *H04L 5/0048* (2013.01); *H04L 25/03006* (2013.01); *H04B 7/0413* (2013.01); *H04L 2025/03624* (2013.01)

(58) Field of Classification Search
CPC ..... H04L 2025/03426; H04L 25/03318; H04L 25/067; H04L 25/0204; H04L 27/2647;
(Continued)

(56) References Cited

U.S. PATENT DOCUMENTS 8,526,523 B1 *  9/2013  Eliaz ................. H04L 25/03178
                                                            375/261
9,008,240 B1    4/2015  Wan et al.
(Continued)

FOREIGN PATENT DOCUMENTS

CN         101582748 A       11/2009

OTHER PUBLICATIONS

English abstract translation of CN patent 101582748A.
(Continued)

*Primary Examiner* — Sai Aung
(74) *Attorney, Agent, or Firm* — WPAT, PC

(57) ABSTRACT

The present invention discloses an ML (Maximum Likelihood) detector. An embodiment of the ML detector comprises a search value selecting circuit and an ML detecting circuit. The search value selecting circuit is configured to select a first-layer search value. The ML detecting circuit is configured to carry out the following steps: selecting first-layer candidate values according to the first-layer search value, one of a reception signal and a derivative thereof, and one of a channel estimation signal and a derivative thereof, and adding one or more first-layer candidate value(s), if necessary; calculating second-layer candidate values according to all the above-mentioned first-layer candidate values, and adding one or more second-layer candidate value(s) and its/their corresponding first-layer candidate value(s), if necessary; and calculating log likelihood ratios according to the whole first-layer and second-layer candidate values.

20 Claims, 14 Drawing Sheets

(51) Int. Cl.
*H04L 25/03* (2006.01)
*H04B 7/0413* (2017.01)

(58) Field of Classification Search
CPC ......... H04L 2025/0342; H04L 25/0246; H04L 27/38
See application file for complete search history.

(56) References Cited

U.S. PATENT DOCUMENTS

| | | |
|---|---|---|
| 2009/0141835 A1 | 6/2009 | Yang et al. |
| 2010/0027693 A1 | 2/2010 | Vijayan et al. |
| 2014/0037029 A1* | 2/2014 | Murakami ............... H04L 27/34 375/340 |
| 2015/0207588 A1* | 7/2015 | Tanada .................. H04L 25/022 370/252 |
| 2017/0149533 A1* | 5/2017 | Mejri .................... H04L 1/0052 |
| 2017/0155436 A1* | 6/2017 | Murakami ........... H04B 7/0456 |

OTHER PUBLICATIONS

Massimiliano Siti et al., "A Novel Soft-Output Layered Orthogonal Lattice Detector for Multiple Antenna Communications", IEEE International Conference on Communications (ICC), 2006.

\* cited by examiner

WIRELESS SIGNAL RECEIVER WITH MAXIMUM LIKELIHOOD DETECTOR

BACKGROUND OF THE INVENTION

1. Field of the Invention

The present invention relates to wireless signal reception technique, especially to wireless signal reception technique using maximum likelihood detection.

2. Description of Related Art

Nowadays wireless communication technique is widely spread and users have more and more demand for data throughput. Therefore, this industry field keeps studying how to increase bandwidth usage efficiency under limited system bandwidth and raise system throughput. A market trend is using a spatial multiplexing transmission manner of multiple-input multiple-output (MIMO) technique which can greatly raise system throughput without engaging more bandwidth. This transmission manner gets a lot of attention recently.

The spatial multiplexing transmission manner uses a plurality of antennas of a transmitter to transmit signals independent of one another through the same frequency band at the same time, while a receiver uses a plurality of antennas to receive and detect these signals. In order to achieve better demodulation efficiency, the receiver may use a maximum likelihood algorithm (ML algorithm). The ML algorithm could be understood as an algorithm in search of an optimum solution. The ML algorithm makes use of an exhaustive search manner to estimate an optimum solution of transmission signals among all possible solutions according to reception signals. However, the exhaustive search manner is not an efficient manner because it computes all of the possible solutions and takes a long time to measure processing latency, complexity and computation power.

People who are interested in the prior arts may refer to the following literatures:
(1) China patent application of publication number CN101582748A; and
(2) Massimiliano Siti, Michael P. Fitz, "*A Novel Soft-Output Layered Orthogonal Lattice Detector for Multiple Antenna Communications*", IEEE International Conference on Communications (ICC), 2006.

SUMMARY OF THE INVENTION

In consideration of the problems of the prior arts, an object of the present invention is to provide a maximum likelihood detector for making improvements over the prior arts.

The present invention discloses a maximum likelihood detector (ML detector) configured to execute a maximum likelihood detection (ML detection) according to one of a reception signal and a derivative thereof and according to one of a channel estimation signal and a derivative thereof. An embodiment of the ML detector comprises: a search value selecting circuit configured to determine a first-layer search value; and a maximum likelihood detecting circuit (ML detecting circuit). The ML detecting circuit is configured to execute at least the following steps: selecting K first-layer candidate signal values according to the first-layer search value, one of the reception signal and the derivative thereof, and one of the channel estimation signal and the derivative thereof, in which the K is an integer greater than one; determining whether to add Q first-layer candidate signal value(s) according to the K first-layer candidate signal values and thereby generating a first decision result, in which the Q is a positive integer; when the first decision result is affirmative, adding the Q first-layer candidate signal value(s), and calculating (K+Q) second-layer candidate signal values according to (K+Q) first-layer candidate signal values composed of the K and the Q first-layer candidate signal values; when the first decision result is affirmative, determining whether to add P second-layer candidate signal value(s) according to the (K+Q) second-layer candidate signal values and thereby generating a second decision result, in which the P is a positive integer; when the first and the second decision results are affirmative, adding the P second-layer candidate signal value(s), selecting P first-layer candidate signal value(s) according to the P second-layer candidate signal value(s), and calculating log likelihood ratios (LLRs) according to (K+Q+P) first-layer candidate signal values composed of the K, the Q and the P first-layer candidate signal values and according to (K+Q+P) second-layer candidate signal values composed of the (K+Q) the P second-layer candidate signal values; when the first decision result is affirmative and the second decision result is negative, calculating LLRs according to the (K+Q) first-layer candidate signal values and the (K+Q) second-layer candidate signal values; when the first decision result is negative, calculating K second-layer candidate signal values according the K first-layer candidate signal values; when the first decision result is negative, determining whether to add R second-layer candidate signal value(s) according to the K second-layer candidate signal values and thereby generating a third decision result, in which the R is a positive integer; when the first decision result is negative and the third decision result is affirmative, adding the R second-layer candidate signal value(s), selecting R first-layer candidate signal value(s) according to the R second-layer candidate signal value(s), and calculating LLRs according to (K+R) first-layer candidate signal values composed of the K and the R first-layer candidate signal values and according to (K+R) second-layer candidate signal values composed of the K and the R second-layer candidate signal values; and when the first and the third decision results are negative, calculating LLRs according to the K first-layer candidate signal values and the K second-layer candidate signal values.

Another embodiment of the aforementioned ML detector comprises: a search value selecting circuit configured to determine a first search value and a second search value; and an ML detecting circuit. The ML detecting circuit is configured to execute at least the following steps: selecting $K_1$ first-layer candidate signal values according to the first search value, one of the reception signal and the derivative thereof, and one of the channel estimation signal and the derivative thereof, in which the $K_1$ is an integer greater than one; determining whether to add Q first-layer candidate signal value(s) according to the $K_1$ first-layer candidate signal values and thereby generating a first decision result, in which the Q is a positive integer; when the first decision result is affirmative, adding the Q first-layer candidate signal value(s), and calculating ($K_1$+Q) second-layer candidate signal values according to ($K_1$+Q) first-layer candidate signal values composed of the $K_1$ and the Q first-layer candidate signal values; when the first decision result is affirmative, calculating log likelihood ratios (LLRs) according to the ($K_1$+Q) first-layer candidate signal values and the ($K_1$+Q) second-layer candidate signal values; when the first decision result is negative, calculating $K_1$ second-layer candidate signal values according to the $K_1$ first-layer candidate signal values and calculating LLRs according to the $K_1$ first-layer candidate signal values and $K_1$ second-layer candidate signal values; selecting $K_2$ first-layer candidate signal values according to the second search value, one of the reception signal and the derivative thereof, and one of a swap signal of the channel estimation signal and a derivative of the swap signal, in which the $K_2$ is an integer greater than one; determining whether to add P first-layer candidate signal value(s) according to the $K_2$ first-layer candidate signal values and thereby generating a second decision result, in which the P is a positive integer; when the second decision result is affirmative, adding the P first-layer candidate signal value(s), and calculating ($K_2$+P) second-layer candidate signal values according to ($K_2$+P) first-layer candidate signal values composed of the $K_2$ and the P first-layer candidate signal values; when the second decision result is affirmative, calculating LLRs according to the ($K_2$+P) first-layer candidate signal values and the ($K_2$+P) second-layer candidate signal values; when the second decision result is negative, calculating $K_2$ second-layer candidate signal values according to the $K_2$ first-layer candidate signal values and calculating LLRs according to the $K_2$ first-layer candidate signal values and $K_2$ second-layer candidate signal values.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a maximum likelihood detector (ML detector), a maximum likelihood detecting method (ML detecting method) and a wireless signal receiver with a maximum likelihood detection function (ML detection function) configured to operate by bit in the manner of soft decision to output a log likelihood ratio (LLR) to a decoding circuit for error correction. On account of that some element of the ML detector and the wireless signal receiver of the present disclosure could be known, the detail of such element will be omitted, provided that this omission has little to do with the written description and enablement requirements. Besides, the method of the present disclosure can be in the form of firmware and/or software which could be carried out by the hardware of the present disclosure or the equivalent thereof. The present invention is applicable to multiple-dimension or multiple-layer signal reception such as signal reception of a multiple-input multiple output (MIMO) communication system. Communication technique using MIMO, for example, includes Long-Term Evolution (LTE) technique, Wireless Local-Area Network (WLAN) technique, Worldwide Interoperability for Microwave Access (WiMax) technique, etc. For the convenience of understanding, the embodiments in this specification are described in accordance with applications of LTE communication system; however, the present invention can be applied to other kinds of communication systems.

Figure 1:
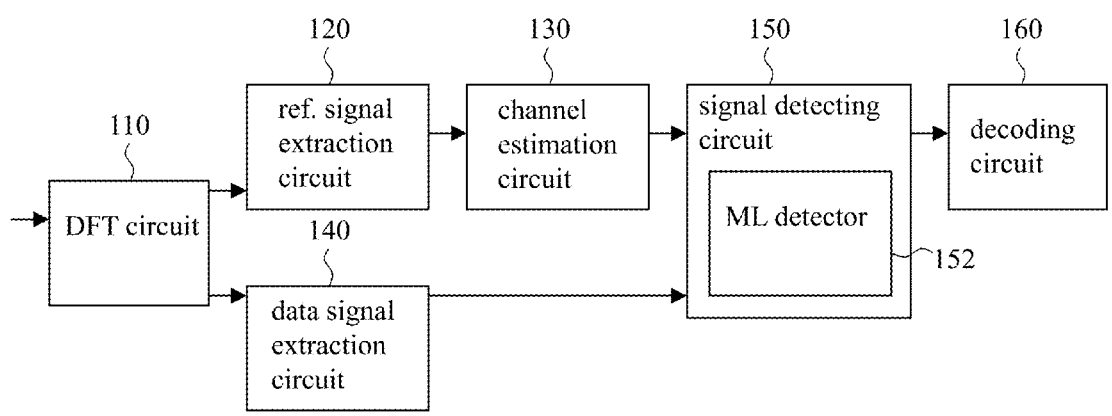
FIG. 1 illustrates an embodiment of the wireless signal receiver with a maximum likelihood detection function according to the present invention.

Please refer to FIG. 1. FIG. 1 illustrates an embodiment of the wireless signal receiver with the ML detection function according to the present invention. The wireless signal receiver 100 of FIG. 1 comprises: a Discrete Fourier Transform (DFT) circuit 110 configured to convert a time-domain signal into a frequency-domain signal; a reference signal (i.e., ref. signal in FIG. 1) extraction circuit 120 configured to generate an extraction reference signal according to the frequency-domain signal; a channel estimation circuit 130 configured to generate an estimation signal according to the extraction reference signal; a data signal extraction circuit 140 configured to generate an extraction data signal according to the frequency-domain signal; a signal detecting circuit 150 configured to generate a detection signal according to the channel estimation signal and the extraction data signal; and a decoding circuit 160 configured to generate a decoded signal according to the detection signal. The signal detecting circuit 150 includes a maximum likelihood detector (ML detector) 152 configured to execute at least the following steps: determining a first-layer search value; selecting K first-layer candidate signal values according to the first-layer search value, one of the reception signal and the derivative thereof, and one of the channel estimation signal and the derivative thereof, in which the K is an integer greater than one; determining whether to add Q first-layer candidate signal value(s) according to the K first-layer candidate signal values and thereby generating a first decision result, in which the Q is a positive integer; when the first decision result is affirmative, adding the Q first-layer candidate signal value(s), and calculating (K+Q) second-layer candidate signal values according to (K+Q) first-layer candidate signal values composed of the K and the Q first-layer candidate signal values; when the first decision result is affirmative, determining whether to add P second-layer candidate signal value(s) according to the (K+Q) second-layer candidate signal values and thereby generating a second decision result, in which the P is a positive integer; when the first and the second decision results are affirmative, adding the P second-layer candidate signal value(s), selecting P first-layer candidate signal value(s) according to the P second-layer candidate signal value(s), and calculating log likelihood ratios (LLRs) according to (K+Q+P) first-layer candidate signal values composed of the K, the Q and the P first-layer candidate signal values and according to (K+Q+P) second-layer candidate signal values composed of the (K+Q) the P second-layer candidate signal values; when the first decision result is affirmative and the second decision result is negative, calculating LLRs according to the (K+Q) first-layer candidate signal values and the (K+Q) second-layer candidate signal values; when the first decision result is negative, calculating K second-layer candidate signal values according the K first-layer candidate signal values; when the first decision result is negative, determining whether to add R second-layer candidate signal value(s) according to the K second-layer candidate signal values and thereby generating a third decision result, in which the R is a positive integer; when the first decision result is negative and the third decision result is affirmative, adding the R second-layer candidate signal value(s), selecting R first-layer candidate signal value(s) according to the R second-layer candidate signal value(s), and calculating LLRs according to (K+R) first-layer candidate signal values composed of the K and the R first-layer candidate signal values and according to (K+R) second-layer candidate signal values composed of the K and the R second-layer candidate signal values; and when the first and the third decision results are negative, calculating LLRs according to the K first-layer candidate signal values and the K second-layer candidate signal values. The above-mentioned Q first-layer candidate signal value(s), P second-layer candidate signal value(s) and R second-layer candidate signal value(s) can be called supplemental candidate signal values. An embodiment of the decoding circuit 160 includes a descrambler and a turbo decoder, in which the descrambler is configured to generate a descrambled signal according to the detection signal and the turbo decoder is configured to generate the decoded signal according to the descrambled signal. Each of the DFT circuit 110, the reference signal extraction circuit 120, the channel estimation circuit 130, the data signal extraction circuit 140 and the decoding circuit 160 itself is a known or self-developed circuit.

On the basis of the above, the time-domain signal is converted into the frequency-domain signal through DFT, and the extraction data signal $Y_n$ of the $n^{th}$ sub-carrier in the frequency domain can be expressed by a $N_R \times 1$ vector as shown below:

$$Y_n = H_n X_n + W_n \qquad (Eq. 1),$$

in which $H_n$ stands for a $N_R \times N_T$ channel matrix from the $n^{th}$ sub-carrier's point of view, $X_n$ stands for the $N_T \times 1$ transmission signal of the $n^{th}$ sub-carrier, $W_n$ stands for the $n^{th}$ sub-carrier's noise, $N_R$ is the number of reception antenna(s), and $N_T$ is the number of transmission antenna(s). This embodiment takes the signal of a sub-carrier as a to-be-processed unit; for the convenience of expression, in the following description, the suffix n is omitted. In addition, this embodiment relates to an application of two-transmission two-reception spatial multiplexing transmission, that is to say both the number of independent spatial streams at a transmission end and the number of independent spatial streams at a reception end being two (and each of $N_R$ and $N_T$ being not less than two). Accordingly, Eq. 1 can be simplified as follows:

$$Y = HX + W \qquad (Eq. 2)$$

In an LTE system, a reference signal (RS) and a data signal are carried by different sub-carriers, and thus the channel estimation circuit 130 derives a channel response matrix $\hat{H}$ of a target data signal based on channel estimation, which is estimated according to the reference signal, in the manner of interpolation or extrapolation; then the signal detecting circuit 150 performs QR decomposition or the equivalent thereof to the matrix $\hat{H}$ as shown below:

$$\hat{H} = QR \qquad (Eq. 3),$$

in which Q is a unitary matrix and R is an upper triangular matrix. After the QR decomposition or the equivalent thereof is done, the signal detecting circuit 150 multiplies the reception signal Y (i.e., the aforementioned extraction data signal) by $Q^H$ (i.e., Hermitian matrix of matrix Q) or executes an equivalent calculation to obtain a signal Z as follows:

$$Z \equiv Q^H Y = Q^H(HX+W) = Q^H(QRX+W) = RX+W' \qquad (Eq. 4),$$

in which $W' \equiv Q^H W$. Afterward, the ML detector 152 calculates a log likelihood ratio (LLR) by bit according to the signal Z of Eq. 4. The calculation could be expressed as follows:

$$L(b_i \mid Y) = \min_{\tilde{X} \in G(X_{b_i=1})} \|Z - R\tilde{X}\|^2 - \min_{\tilde{X} \in G(X_{b_i=0})} \|Z - R\tilde{X}\|^2, \qquad (Eq. 5)$$

in which $b_i$ stands for $i^{th}$ bit, $G(X_{b_i=0})$ stands for a group of transmission signal(s) whose $i^{th}$ bit is/are 0, $G(X_{b_i=1})$ stands for a group of transmission signal(s) whose $i^{th}$ bit is/are 1, $\tilde{X}$ stands for candidate signal value(s) of the calculation process, and the symbol "~" is used to distinguish $\tilde{X}$ from a real signal X.

Figure 2:
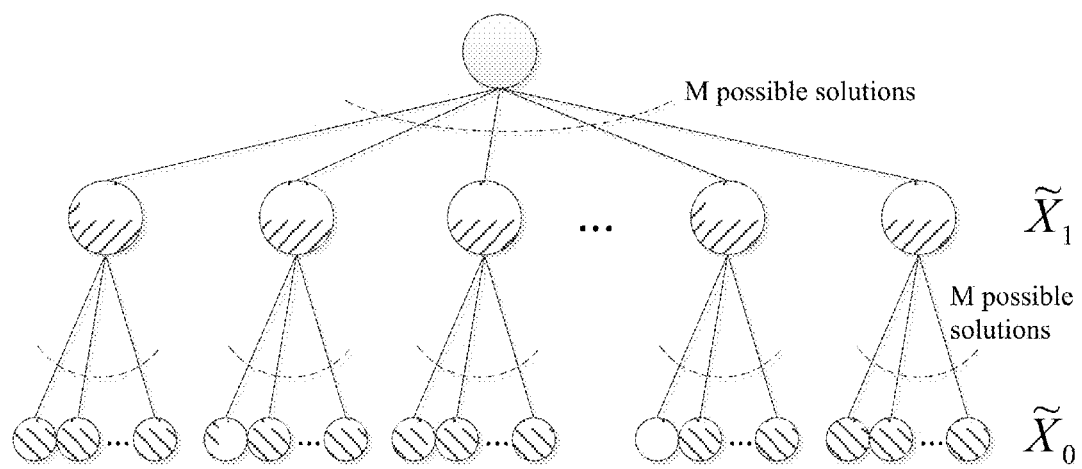
FIG. 2 shows a tree diagram of exhaustive search.

Eq. 5 can be regarded as an equation in search of an optimum solution, and the optimum solution can be found through exhaustive search as mentioned in the description of related art. If the modulation type of a transmission signal is M-QAM (i.e., quadrature amplitude modulation with a signal set of size M (which implies that the number of constellation points in a constellation diagram corresponding to such modulation type is M)), for two-layer independent data streams of two-transmission two-reception, the number of possible solutions of Eq. 5 (i.e., candidate signal value(s)) is $M^2$ which can be illustrated by a tree diagram as shown in FIG. 2.

In detail, since R is an upper triangular matrix, the operation in search of $$\min_{\tilde{X}} \|Z - R\tilde{X}\|^2$$

can be simplified. Firstly, $$\min_{\tilde{X}} \|Z - R\tilde{X}\|^2$$

can be decomposed as follows:

$$\min_{\tilde{X}} \|Z - R\tilde{X}\|^2 = \min_{\tilde{X}} \left\| \begin{bmatrix} Z_0 \\ Z_1 \end{bmatrix} - \begin{bmatrix} R_{00} & R_{01} \\ 0 & R_{11} \end{bmatrix} \begin{bmatrix} \tilde{X}_0 \\ \tilde{X}_1 \end{bmatrix} \right\|^2 \qquad (Eq. 6)$$

$$= \min_{\tilde{X}} \left[ |Z_0 - R_{00}\tilde{X}_0 - R_{01}\tilde{X}_1|^2 + |Z_1 - R_{11}\tilde{X}_1|^2 \right]$$

Figure 3:
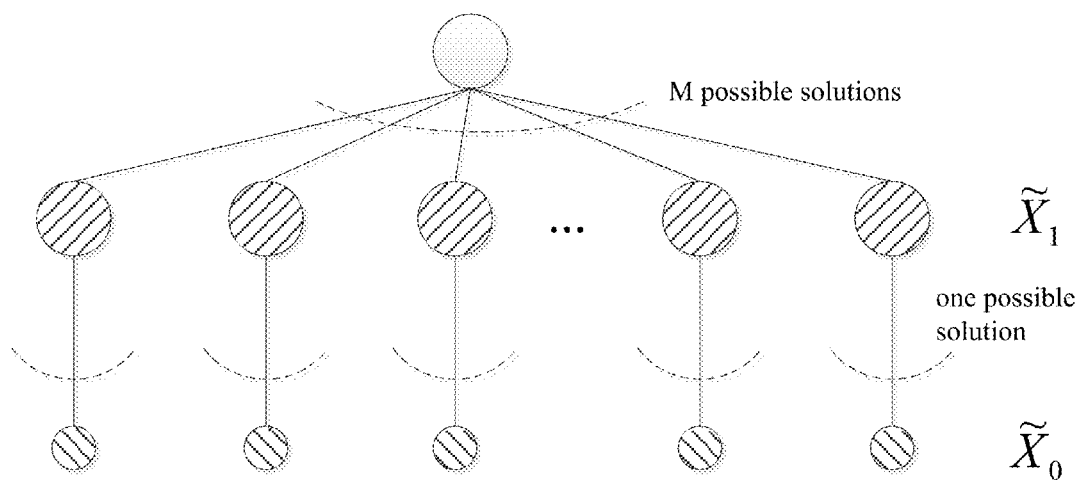
FIG. 3 shows a tree diagram under a configuration of a Layer Orthogonal Lattice Detector.

Since the square of an absolute value is not less than zero, $\|Z-R\tilde{X}\|^2$ will be the minimum with a selected $\tilde{X}_1$ when the following equation is true:

$$\tilde{X}_0 = \Gamma\left[\frac{Z_0 - R_{01}\tilde{X}_1}{R_{00}}\right], \quad \text{(Eq. 7)}$$

in which $\Gamma[\ ]$ stands for a quantizer. In other words, after $\tilde{X}_1$ is selected, the one and only solution derived from Eq. 7 is $\tilde{X}_0$. The configuration associated with Eq. 6 and Eq. 7 is called a Layer Orthogonal lattice Detector (LOAD). Under such configuration, a tree diagram for search can be greatly simplified as shown in FIG. 3. In a LOAD configuration corresponding to FIG. 3, at the first layer are unfolded all possible solutions (M possible solutions) of $\tilde{X}_1$, and at the second layer is derived $\tilde{X}_0$ according to Eq. 7 directly; accordingly, there is no need to unfold all possible solutions of $\tilde{X}_0$ in comparison with FIG. 2. As a result, the whole computation complexity is up to the number of possible solutions of $\tilde{X}_1$ unfolded at the first layer.

A log likelihood ratio (LLR) of every bit can be obtained through the calculation of Eq. 5 associated with the LOAD configuration corresponding to FIG. 3, which implies that a number of the LLRs is equal to a number of the bits of the transmission signal; afterward these LLRs are inputted to a decoder for error correction so as to complete a reception process. However, take M-QAM; the number of possible solutions (i.e., the number of $\tilde{X}_1$ unfolded at the first layer in FIG. 3) is M, and some of the possible solutions therein is unlikely to be correct and better to be removed from consideration for simplifying calculation. Therefore, the ML detector 152 of FIG. 1 does not calculate LLRs of the M possible solutions, but selects/determines a search value first and then executes an ML calculation according to the search value and one of the frequency-domain signal and the derivative thereof (e.g., the aforementioned extraction data signal) to generate the detection signal including LLR(s) as described in the preceding paragraph, in which the search value is associated with a search range, and the number of candidate signal value(s) in the search range (that is to say the number of constellation points within the search range in a constellation diagram corresponding to the modulation type) is not greater than the number of all candidate signal values of the modulation type (that is to say the number of all constellation points in the constellation diagram corresponding to the modulation type). In other words, the ML detector 152 in FIG. 1 unfolds only K possible solution(s) (i.e., K candidate signal values) of $\tilde{X}_1$ (or $\tilde{X}_0$) at the first layer, and since K≤M, lower computation complexity and power consumption can be realized without substantially reducing performance. It should be noted that in a reversed operation, the ML detector 152 may unfold possible solutions of $\tilde{X}_0$ at the first layer with the aid of a swap operation decision unit (which will be explained in the following paragraphs) and then unfold possible solutions of $\tilde{X}_1$ at the second layer. For the ease of understanding, most of the embodiments in the following description adopt a straight operation which unfolds possible solutions of $\tilde{X}_1$ at the first layer and then unfolds possible solutions of $\tilde{X}_0$ at the second layer. However, the reversed operation may be adopted according to implementer's discretion, and can be easily derived from the disclosure of the straight operation in this specification.

Figure 4:
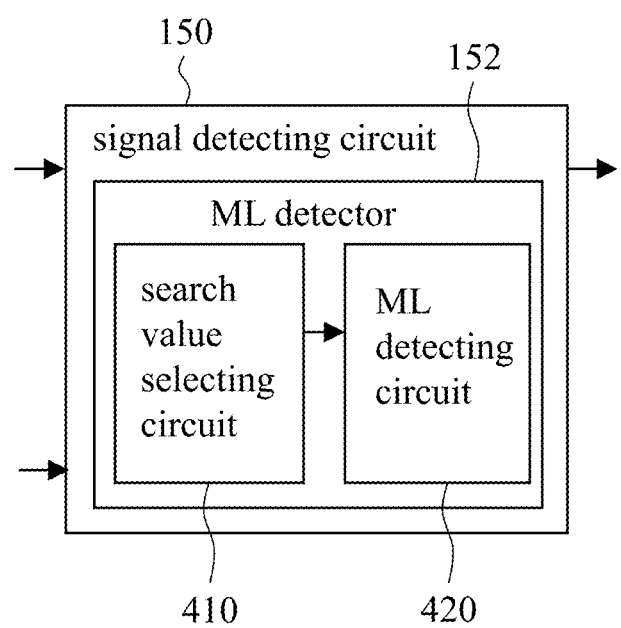
FIG. 4 illustrates an embodiment of the maximum likelihood detector of the present invention.

In detail, an embodiment of the ML detector 152 is shown in FIG. 4, including a search value selecting circuit 410 and a maximum likelihood detecting circuit (ML detecting circuit) 420. The search value selecting circuit 410 is configured to determine the aforementioned first-layer search value. An example of the first-layer search value is not less than a predetermined threshold. A number of the first-layer candidate signal value(s), associated with the predetermined threshold, is not greater than a number of all first-layer candidate signal values of the modulation type. For instance, when the modulation type is M-QAM, a non-restrictive example of the first-layer search value is an integer greater than M/4, and another non-restrictive example of the first-layer search value is an integer between 4 and $(\sqrt{M}-1)^2$. The ML detecting circuit 420 is configured to execute the calculation of Eq. 8 and a look-up-table operation, which are described in the following paragraphs, to obtain the first-layer candidate signal value(s), and configured to execute the calculation of the aforementioned Eq. 7 to obtain the second-layer candidate signal value(s), and further configured to execute the calculation of the aforementioned Eq. 5 to generate the LLRs.

Figure 5:
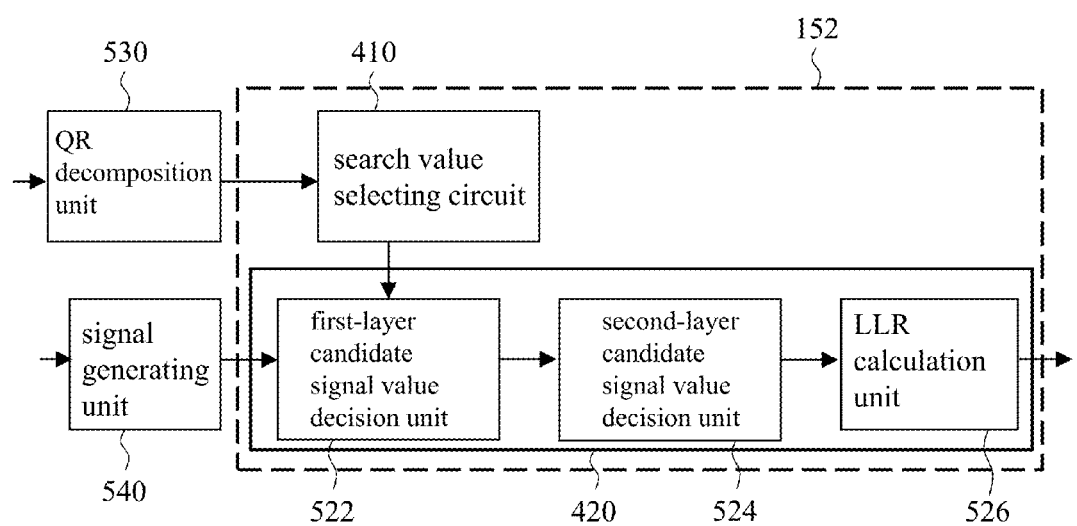
FIG. 5 illustrates an embodiment of the signal detecting circuit of FIG. 4.

An exemplary implementation of the signal detecting circuit 150 of FIG. 4 is shown in FIG. 5, including: a QR decomposition unit 530 configured to execute the calculation of Eq. 3 or the equivalent thereof according to the aforementioned estimation signal (associated with or equal to the channel response matrix $\hat{H}$); a signal generating unit 540 configured to execute the calculation of Eq. 4 or the equivalent thereof according to the aforementioned extraction data signal (associated with or equal to the aforementioned signal Y); the search value selecting circuit 410; and the ML detecting circuit 420. In FIG. 5, the ML detecting circuit 420 includes: a first-layer candidate signal value decision unit 522 configured to execute the calculation of Eq. 8 or the equivalent thereof according to the extraction data signal so as to generate a computation result, and configured to execute the following look-up-table operation or the equivalent thereof according to the computation result and the first-layer search value so as to generate an operation result; and a second-layer candidate signal value decision unit 524 configured to execute the calculation of Eq. 7 or the equivalent thereof according to the operation result so as to generate a calculation result including the operation result; and an LLR calculation unit 526 configured to execute the calculation of Eq. 5 or the equivalent thereof according to the calculation result. Each of the said QR decomposition unit 530 and signal generating unit 540 itself is a known or self-developed unit.

The ML detecting circuit 420 selects the first-layer search value, which is associated with the search range, according to the pinpoint of a reception signal mapped on a constellation diagram corresponding to the modulation type. Based on Eq. 6, an exemplary implementation of the ML detecting circuit 420 includes a zero-forcing (ZF) equalizer, which is included in the candidate signal value decision unit 422, to execute a ZF calculation as shown below for determining the pinpoint $\tilde{X}_{1,eq}$ of $\tilde{X}_1$ mapped on a constellation diagram:

$$\tilde{X}_{1,eq} = \frac{Z_1}{R_{11}} \quad \text{(Eq. 8)}$$

In light of the feature of a constellation diagram, the distance (that is to say difference) between each constellation point of the constellation diagram and the pinpoint $\tilde{X}_{1,eq}$ can be determined in advance.

Figure 6:
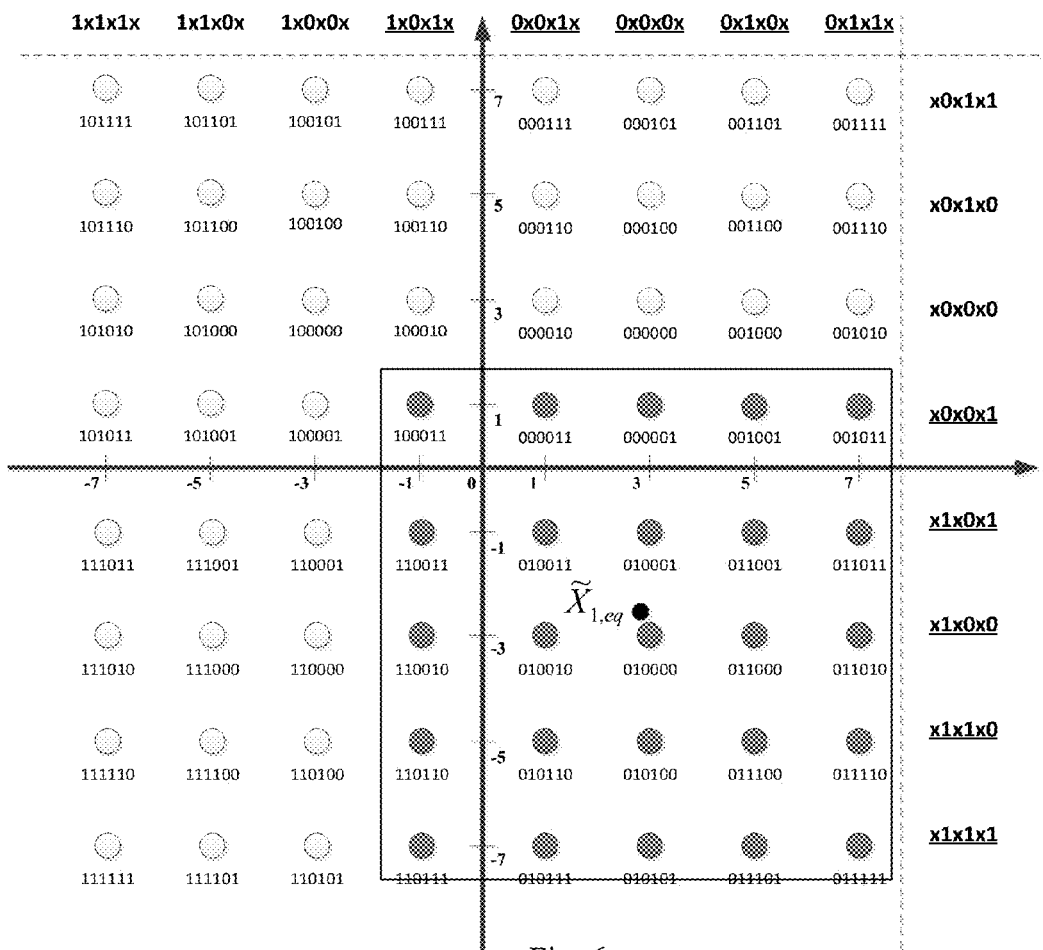
FIG. 6 illustrates an exemplary operation, which is executed by the maximum likelihood detector of FIG. 4, with a constellation diagram.
Figure 7:
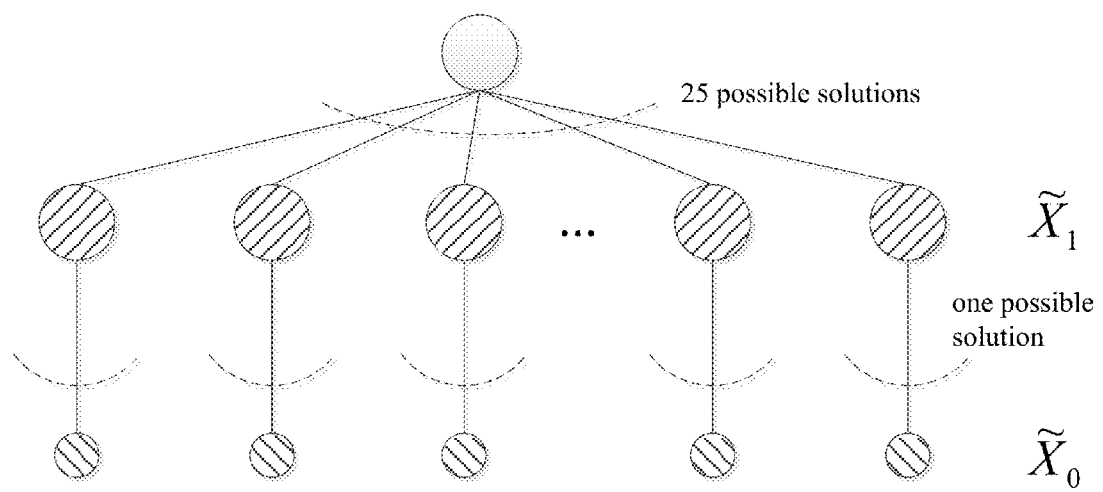
FIG. 7 shows a tree diagram associated with FIG. 6.

Take 64-QAM of LTE for example. Fourteen sections can be defined as shown in Table 1 below according to the relation between the locations of the pinpoint $\tilde{X}_{1,eq}$ (i.e., a reference value associated with the pinpoint $\tilde{X}_{1,eq}$) and the constellation points. In each section of Table 1, the left-to-right order indicates that the distance between a constellation point in the section and the pinpoint $\tilde{X}_{1,eq}$ gets farther by the order. With the constellation diagram of FIG. 6, the pinpoint $\tilde{X}_{1,eq}$ of $\tilde{X}_1$ mapped on the constellation diagram is clearly shown, in which the symbol "x" of the digits "1x1x1x", "x0x1x1", etc. can be zero or one. In the example of FIG. 6, the real-part of $\tilde{X}_{1,eq}$ is located between the section 2≤S≤3 and the real-parts of the constellation points in the section by the close-to-far order (corresponding to the aforementioned left-to-right order) are 3, 1, 5, −1, 7, −3, −5 and −7 which amount to eight possible solutions. Similarly, the imaginary-part of $\tilde{X}_{1,eq}$ is located between the section −3≤S≤−2 and the imaginary-parts of the constellation points in the section by the close-to-far order are −3, −1, −5, 1, −7, 3, 5 and 7 which amount to eight possible solutions. Assuming that the search value selected/determined by the search value selecting circuit 410 is twenty-five (which implies that only twenty-five possible solutions of $\tilde{X}_1$ (or $\tilde{X}_0$) are unfolded by the ML detecting circuit 420 at the first layer), the ML detecting circuit 420 will pick five real-parts closest to the pinpoint $\tilde{X}_{1,eq}$ and five imaginary-parts closest to the pinpoint $\tilde{X}_{1,eq}$ to obtain 5×5=25 possible solutions (i.e., 25 first-layer candidate signal values) which can be understood as a search range (e.g., a range in a shape of rectangle or another form) surrounding the pinpoint $\tilde{X}_{1,eq}$ (i.e., the center) in FIG. 6, and all constellation points within this search range are the constellation points (e.g., those closest to the pinpoint $\tilde{X}_{1,eq}$) calculated by the ML detecting circuit 420 when unfolding $\tilde{X}_1$ at the first layer; meanwhile, the constellation points without the search range are removed from consideration. Accordingly, the present embodiment can lower computation complexity as shown in the tree diagram of FIG. 7. It should be noted that the present embodiment may obtain the combination of the picked real-parts and imaginary-parts (i.e., the said possible solutions) through a look-up-table operation accessing pre-stored data (e.g., the data of Table 1), so as to make the ML detecting circuit 420 calculate LLR(s) according to Eq. 5 more efficiently.

TABLE 1

| S < −6 | −7 | −5 | −3 | −1 | 1 | 3 | 5 | 7 |
|---|---|---|---|---|---|---|---|---|
| −6 ≤ S < −5 | −5 | −7 | −3 | −1 | 1 | 3 | 5 | 7 |
| −5 ≤ S < −4 | −5 | −3 | −7 | −1 | 1 | 3 | 5 | 7 |
| −4 ≤ S < −3 | −3 | −5 | −1 | −7 | 1 | 3 | 5 | 7 |
| −3 ≤ S < −2 | −3 | −1 | −5 | 1 | −7 | 3 | 5 | 7 |
| −2 ≤ S < −1 | −1 | −3 | 1 | −5 | 3 | −7 | 5 | 7 |
| −1 ≤ S < 0 | −1 | 1 | −3 | 3 | −5 | 5 | −7 | 7 |
| 0 ≤ S < 1 | 1 | −1 | 3 | −3 | 5 | −5 | 7 | −7 |
| 1 ≤ S < 2 | 1 | 3 | −1 | 5 | −3 | 7 | −5 | −7 |
| 2 ≤ S < 3 | 3 | 1 | 5 | −1 | 7 | −3 | −5 | −7 |
| 3 ≤ S < 4 | 3 | 5 | 1 | 7 | −1 | −3 | −5 | −7 |
| 4 ≤ S < 5 | 5 | 3 | 7 | 1 | −1 | −3 | −5 | −7 |
| 5 ≤ S < 6 | 5 | 7 | 3 | 1 | −1 | −3 | −5 | −7 |
| 6 ≤ S | 7 | 5 | 3 | 1 | −1 | −3 | −5 | −7 |

Referring to FIG. 6, it is obvious that the scope of the search range has dominant influence on the computation complexity. When the search range includes all constellation points (i.e., sixty-four constellation points in FIG. 6), the computation complexity of the present embodiment is equivalent to the computation complexity of the aforementioned LORD configuration. In other words, the computation complexity of the present embodiment is equal to or less than the computation complexity of the LORD configuration. Of course the scope of the search range can be set in advance, and can be modified according to a communication status. When the scope of the search range is set in advance, the first-layer search value is determined by the search value selecting circuit 410 in accordance with the aforementioned predetermined value; for instance, the search value is equal to the predetermined value. When the scope of the search range is set according to the communication status, the index of the communication status (i.e., the aforementioned communication index) could be associated with at least one of a signal-to-noise ratio, sub-carrier reception signal energy strength, channel energy strength, channel correlation, channel estimation precision and interference energy strength, etc.

On the basis of the above, when the scope of the search range is determined according to the communication status, the scope of the search range, for example, could be determined according to the signal-to-noise ratio (SNR) during the ML detecting circuit 420 executing the ZF calculation for determining the pinpoint $\tilde{X}_{1,eq}$ of $\tilde{X}_1$ on the constellation diagram. The said SNR can be represented by the symbol γ, and expressed as follows:

$$\gamma = \frac{|R_{11}|^2}{\sigma_W^2} \qquad \text{(Eq. 9)}$$

in which $\sigma_W^2$ stands for noise energy which can be measured in a conventional way known in this field, and $R_{11}$ is one of the elements of the aforementioned upper triangular matrix R. The greater the γ, the more reliable the ZF calculation result of the ML detecting circuit 420; in this case, the search value selecting circuit 410 may select a smaller search value (i.e., smaller search range). On the other hand, the smaller the γ, the greater the search value (i.e., the greater search range) that the search value selecting circuit 410 may choose. In light of the above, the present embodiment may define one or more threshold(s) $T_g$ (g=1, 2, . . . , G), in which $T_g < T_{g+1}$. As shown in Table 2, when γ is greater than some threshold $T_g$ (e.g., $T_1$), the search value selecting circuit 410 will adopt a smaller search value (e.g., $K_2$), in which $K_{G+1} < K_G < \ldots < K_2 < K_1$.

TABLE 2

| γ < $T_1$ | $K_1$ |
|---|---|
| $T_1$ ≤ γ < $T_2$ | $K_2$ |
| . | . |
| . | . |
| . | . |
| $T_g$ ≤ γ < $T_{g+1}$ | $K_g$ |
| . | . |
| . | . |
| . | . |
| $T_G$ ≤ γ | $K_{G+1}$ |

In addition to the SNR (as shown in Eq. 9), the search value selecting circuit 410 is operable to select the search value (i.e., search range) according to other communication indexes. For instance, the search value selecting circuit 410 may select the search value according to channel correlation ρ which can be expressed as follows:

$$\rho = \frac{h_1^H h_2}{\sqrt{\|h_1\|_2^2} \sqrt{\|h_2\|_2^2}} \qquad \text{(Eq. 10)}$$

In Eq. 10, $h_1$ stands for the first column of the channel response matrix $\hat{H}$ and $h_2$ stands for the second column of the matrix $\hat{H}$. The greater the $\rho$ (i.e., the smaller the $1/\rho$), the more unreliable the ZF calculation result of $\tilde{X}_1$ calculated by the ML detecting circuit 420; in this case, the search value selecting circuit 410 may select a greater search value (i.e., greater search range). On the other hand, the smaller the $\rho$ (i.e., the greater the $1/\rho$), the smaller the search value (i.e., the smaller search range) that the search value selecting circuit 410 may choose. Therefore, when the communication index (e.g., $\gamma$, $1/\rho$, etc.) is above a first threshold, the first-layer search value is a first value; when the communication index is below the first threshold, the first-layer search value is a second value. The first value is smaller than the second value, and the communication status represented by the communication index above the first threshold is better than the communication status represented by the communication index below the first threshold.

Figure 9:
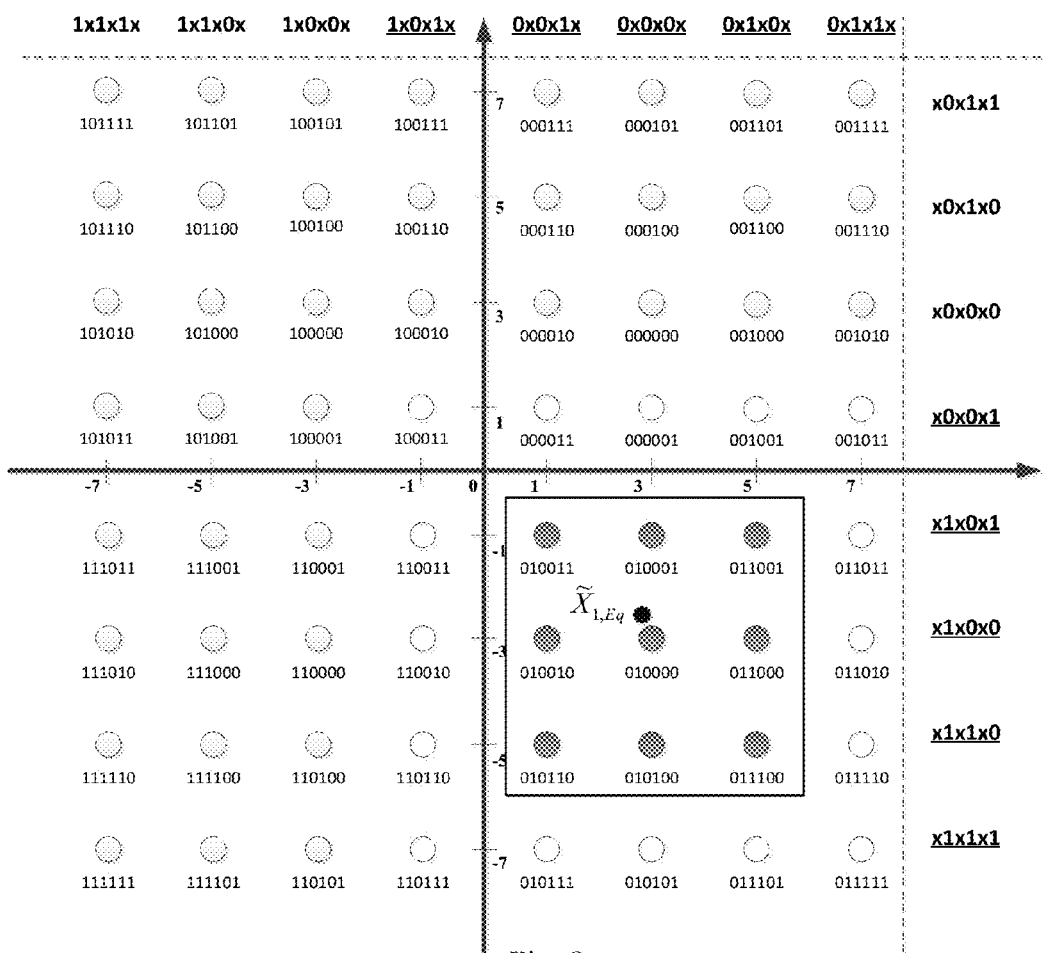
FIG. 9 illustrates an example of insufficient first-layer candidate signal values.

On the basis of the above, when the first-layer search value is not great enough, in the search range a set of $n^{th}$ bits of all first-layer candidate signal values will lack a set of bit(s) being "0" or "1" as shown in FIG. 9; in the meantime the ML detector 152 will find the set of bit(s) being "0" or "1" is null (i.e., an empty set) when calculating the LLRs of Eq. 5, and such empty set will cause the ML detector 152 to fail to derive correction information when calculating the LLRs (because the concept of LLR calculation is to compare the probability of bit(s) being "1" with the probability of bit(s) being "0" for every bit set (i.e., every set of $n^{th}$ bits)), so that an extra computation process is necessary and performance loss is expected. Therefore, as it is mentioned above, when the first-layer search value is not great enough, after the K first-layer candidate signal values are obtained in accordance with the first-layer search value, the ML detector 152 may further execute the following steps: determining whether to add Q first-layer candidate signal value(s) according to the K first-layer candidate signal values and thereby generating a first decision result, in which the Q is a positive integer; when the first decision result is affirmative, adding the Q first-layer candidate signal value(s), and calculating (K+Q) second-layer candidate signal values according to (K+Q) first-layer candidate signal values composed of the K and the Q first-layer candidate signal values; when the first decision result is affirmative, determining whether to add P second-layer candidate signal value(s) according to the (K+Q) second-layer candidate signal values and thereby generating a second decision result, in which the P is a positive integer; when the first and the second decision results are affirmative, adding the P second-layer candidate signal value(s), selecting P first-layer candidate signal value(s) according to the P second-layer candidate signal value(s), and calculating log likelihood ratios (LLRs) according to (K+Q+P) first-layer candidate signal values composed of the K, the Q and the P first-layer candidate signal values and according to (K+Q+P) second-layer candidate signal values composed of the (K+Q) the P second-layer candidate signal values; and when the first decision result is affirmative and the second decision result is negative, calculating LLRs according to the (K+Q) first-layer candidate signal values and the (K+Q) second-layer candidate signal values. It should be noted that when the first decision result is negative (that is to say the first-layer search value great enough), the effect of such result is the Q being equal to zero. Accordingly, those of ordinary skill in the art can appreciate how to execute the following steps by the ML detector 152: when the first decision result is negative, calculating K second-layer candidate signal values according the K first-layer candidate signal values; when the first decision result is negative, determining whether to add R second-layer candidate signal value(s) according to the K second-layer candidate signal values and thereby generating a third decision result, in which the R is a positive integer; when the first decision result is negative and the third decision result is affirmative, adding the R second-layer candidate signal value(s), selecting R first-layer candidate signal value(s) according to the R second-layer candidate signal value(s), and calculating LLRs according to (K+R) first-layer candidate signal values composed of the K and the R first-layer candidate signal values and according to (K+R) second-layer candidate signal values composed of the K and the R second-layer candidate signal values; and when the first and the third decision results are negative, calculating LLRs according to the K first-layer candidate signal values and the K second-layer candidate signal values. In order to prevent lengthy description, repeated and redundant description is omitted.

Figure 8:
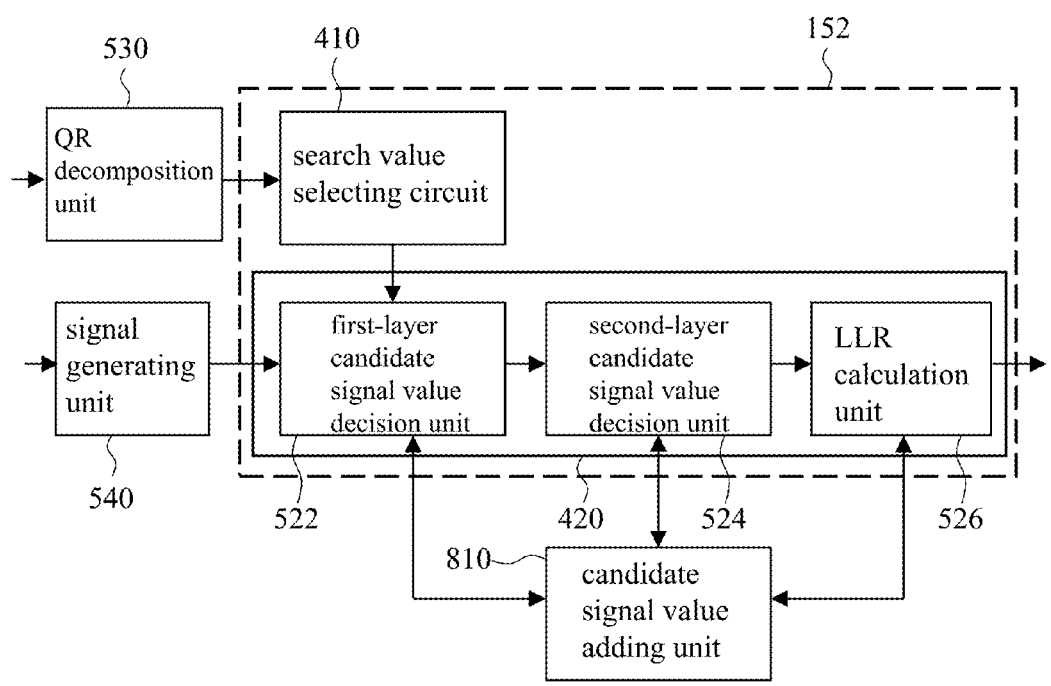
FIG. 8 illustrates an embodiment of the signal detecting circuit of FIG. 4.

On the basis of the above, an example of the step of determining whether to add the Q first-layer candidate signal value(s) includes: determining whether every $n^{th}$ bit value of the K first-layer candidate signal values is identical, in which the n is an integer between 0 and (m−1) and the m is a number of bit(s) of each of the K first-layer candidate signal values; and when determining every $n^{th}$ bit value of the K first-layer candidate signal values is identical, adding the Q first-layer candidate signal value(s). For instance, as shown in FIG. 8, the signal detecting circuit 150 may further include a candidate signal value adding unit 810 configured to determine whether to add supplemental candidate signal value(s). An embodiment of the candidate signal value adding unit 810 may generate a summation by summing the $n^{th}$ bit value of every candidate signal value of the K first-layer candidate signal values up and then determine whether the $n^{th}$ bit value of every candidate signal value is identical according to the summation. More specifically, when the summation is zero, it is ascertained that the $n^{th}$ bit value of every candidate signal value is zero; when the summation is K, it is ascertained that the $n^{th}$ bit value of every candidate signal value of the K first-layer candidate signal values is one. Another embodiment of the candidate signal value adding unit 810 may compare the $n^{th}$ bit value of every candidate signal value with a predetermined bit value, so as to determine whether the $n^{th}$ bit value of every candidate signal value is identical according to whether every comparison result is identical. These and other modifications can be implemented in the candidate signal value adding unit 810. The step of determining whether to add the P or the R second-layer candidate signal value(s) can be derived from the above disclosure by people of ordinary skill in the art.

Figure 10:
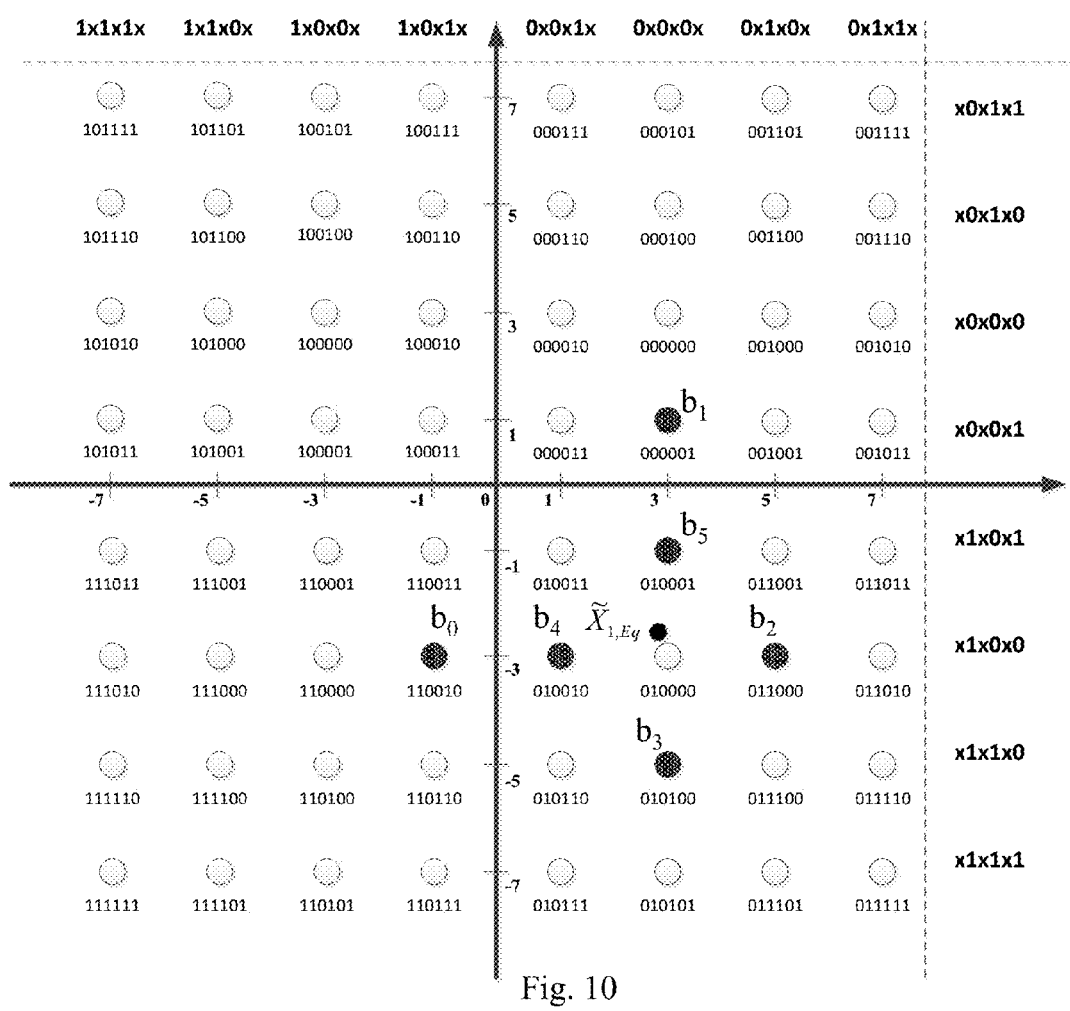
FIG. 10 illustrates an exemplary implementation concept of the candidate signal value adding unit of FIG. 8.

When determining to add the Q first-layer candidate signal value(s), the candidate signal value adding unit 810 may add the Q first-layer candidate signal value(s) by executing the following steps: selecting a first-layer reference candidate signal value (e.g., $\hat{X}_{1,Eq}$ in FIG. 9) from the K first-layer candidate signal values according to a zero-forcing (ZF) calculation result (as shown in Eq. 8); and adding the Q first-layer candidate signal value(s) according to the first-layer reference candidate signal value. For instance, the step of adding the Q first-layer candidate signal value(s) according to the first-layer reference candidate signal value includes: executing a look-up-table operation, which accesses pre-stored data, according to the first-layer reference candidate signal value and thereby adding the Q first-layer candidate signal value(s) according to the pre-stored data, in which on a constellation diagram each of the Q first-layer candidate signal value(s) is in a horizontal or vertical direction of the first-layer reference candidate signal value (as shown in FIG. 10). The constellation diagram is associated with a modulation type of the reception signal, and the Q is not greater than a number of bit(s) of the first-layer reference candidate signal value (e.g., the number of bits of the first-layer reference candidate signal value "010000" is six).

The step of adding the Q first-layer candidate signal value(s) is further explained below. Please refer to FIG. 9 and FIG. 10. Take the $i^{th}$ bit of every $\tilde{X}_1$ being $\bar{j}$; for instance, all the most significant bits of nine $\tilde{X}_1$ in the search range of FIG. 9 are "0" (while bit "1" is missing in the bit set of the most significant bits) and all the second significant bits of $\tilde{X}_1$ in the search range are "1" (while bit "0" is missing in the bit set of the second significant bits). According to the first-layer reference candidate signal value $\tilde{X}_{1,Eq}$, obtained by the aforementioned zero-forcing calculation, each constellation point, whose $i^{th}$ bit is $\bar{j}$, closest to $\tilde{X}_{1,Eq}$ is found, and at least a part (i.e., the constellation point(s) not found in the existing first-layer candidate signal values) of the said constellation point(s) is treated as the Q first-layer candidate value. The above-mentioned process in search of supplemental candidate value(s) is dependent on the design of the constellation diagram. Take FIG. 10 (i.e., a constellation diagram of 64-QAM) for example. When the real-part of $\tilde{X}_{1,Eq}$ is located within the section $2<\text{Re}[\tilde{X}_{1,Eq}]\leq 3$ and the imaginary-part of $\tilde{X}_{1,Eq}$ is located within the section $-3<\text{Im}[\tilde{X}_{1,Eq}]\leq -2$ (and in this case, the bits of the constellation point closest to $\tilde{X}_{1,Eq}$ is "010000" (i.e., the first-layer reference candidate signal value) by an order from the most significant bit to the least significant bit), the constellation point being closest to $\tilde{X}_{1,Eq}$ and having the reversed value of the most significant bit of "$\underline{0}$10000" is labeled as $b_0$, the constellation point being closest to $\tilde{X}_{1,Eq}$ and having the reversed value of the second significant bit of "0$\underline{1}$0000" is labeled as $b_1$, . . . , the constellation point being closest to $\tilde{X}_{1,Eq}$ and having the reversed value of the least significant bit of "01000$\underline{0}$" is labeled as $b_5$, and these constellation points $b_0$, $b_1$, $b_2$, $b_3$, $b_4$ and $b_5$ having the reversed values are eligible for supplemental candidate values (e.g., $b_0$ and $b_1$ eligible for the supplemental candidate signal values of FIG. 9). Such constellation points are located in a cross where the constellation point (i.e., "010000") closest to $\tilde{X}_{1,Eq}$ is centered. The relation between the said constellation points and $\tilde{X}_{1,Eq}$ is listed in Tables 3-5. Accordingly, through a look-up-table operation or an equivalent thereof, the candidate signal value adding unit 810 is capable of finding the constellation points, whose $i^{th}$ bit is $\bar{j}$, closet to the pinpoint $\tilde{X}_{1,Eq}$.

TABLE 3

| | nearest constellation point having the reversed value of the most significant bit | | nearest constellation point having the reversed value of the second significant bit |
|---|---|---|---|
| $\text{Re}[\tilde{X}_{1,Eq}] \leq 0$ | $(1, \text{Im}[\tilde{X}_1])$ | $\text{Im}[\tilde{X}_{1,Eq}] \leq 0$ | $(\text{Re}[\tilde{X}_1], 1)$ |
| $0 < \text{Re}[\tilde{X}_{1,Eq}]$ | $(-1, \text{Im}[\tilde{X}_1])$ | $0 < \text{Im}[\tilde{X}_{1,Eq}]$ | $(\text{Re}[\tilde{X}_1], -1)$ |

TABLE 4

| | nearest constellation point having the reversed value of the third significant bit | | nearest constellation point having the reversed value of the fourth significant bit |
|---|---|---|---|
| $\text{Re}[\tilde{X}_{1,Eq}] \leq -4$ | $(-3, \text{Im}[\tilde{X}_1])$ | $\text{Im}[\tilde{X}_{1,Eq}] \leq 0$ | $(\text{Re}[\tilde{X}_1], -3)$ |
| $-4 < \text{Re}[\tilde{X}_{1,Eq}] \leq 0$ | $(-5, \text{Im}[\tilde{X}_1])$ | $-4 < \text{Im}[\tilde{X}_{1,Eq}] \leq 0$ | $(\text{Re}[\tilde{X}_1], -5)$ |
| $0 < \text{Re}[\tilde{X}_{1,Eq}] \leq 4$ | $(5, \text{Im}[\tilde{X}_1])$ | $0 < \text{Im}[\tilde{X}_{1,Eq}] \leq 4$ | $(\text{Re}[\tilde{X}_1], 5)$ |
| $0 < \text{Re}[\tilde{X}_{1,Eq}]$ | $(3, \text{Im}[\tilde{X}_1])$ | $0 < \text{Im}[\tilde{X}_{1,Eq}]$ | $(\text{Re}[\tilde{X}_1], 3)$ |

TABLE 5

| | nearest constellation point having the reversed value of the fifth significant bit | | nearest constellation point having the reversed value of the least significant bit |
|---|---|---|---|
| $\text{Re}[\tilde{X}_{1,Eq}] \leq -6$ | $(-5, \text{Im}[\tilde{X}_1])$ | $\text{Im}[\tilde{X}_{1,Eq}] \leq -6$ | $(\text{Re}[\tilde{X}_1], -5)$ |
| $-6 < \text{Re}[\tilde{X}_{1,Eq}] \leq -4$ | $(-7, \text{Im}[\tilde{X}_1])$ | $-6 < \text{Im}[\tilde{X}_{1,Eq}] \leq -4$ | $(\text{Re}[\tilde{X}_1], -7)$ |
| $-4 < \text{Re}[\tilde{X}_{1,Eq}] \leq -2$ | $(-1, \text{Im}[\tilde{X}_1])$ | $-4 < \text{Im}[\tilde{X}_{1,Eq}] \leq -2$ | $(\text{Re}[\tilde{X}_1], -1)$ |
| $-2 < \text{Re}[\tilde{X}_{1,Eq}] \leq 0$ | $(-3, \text{Im}[\tilde{X}_1])$ | $-2 < \text{Im}[\tilde{X}_{1,Eq}] \leq 0$ | $(\text{Re}[\tilde{X}_1], -3)$ |
| $0 < \text{Re}[\tilde{X}_{1,Eq}] \leq 2$ | $(3, \text{Im}[\tilde{X}_1])$ | $0 < \text{Im}[\tilde{X}_{1,Eq}] \leq 2$ | $(\text{Re}[\tilde{X}_1], 3)$ |
| $2 < \text{Re}[\tilde{X}_{1,Eq}] \leq 4$ | $(1, \text{Im}[\tilde{X}_1])$ | $2 < \text{Im}[\tilde{X}_{1,Eq}] \leq 4$ | $(\text{Re}[\tilde{X}_1], 1)$ |
| $4 < \text{Re}[\tilde{X}_{1,Eq}] \leq 6$ | $(7, \text{Im}[\tilde{X}_1])$ | $4 < \text{Im}[\tilde{X}_{1,Eq}] \leq 6$ | $(\text{Re}[\tilde{X}_1], 7)$ |
| $6 < \text{Re}[\tilde{X}_{1,Eq}]$ | $(5, \text{Im}[\tilde{X}_1])$ | $6 < \text{Im}[\tilde{X}_{1,Eq}]$ | $(\text{Re}[\tilde{X}_1], 5)$ |

The step of adding the P or the R second-layer candidate signal value(s) is similar to the aforementioned step of adding the Q first-layer candidate signal value(s). More specifically, the first-layer reference candidate signal value of the Q first-layer candidate signal value(s) is obtained through the zero-forcing operation, and the second-layer candidate signal value(s) corresponding to the Q first-layer candidate signal value(s) is/are obtained according to Eq. 7; the second-layer reference candidate signal value of the P or the R second-layer candidate signal value(s) is the signal value capable of reaching a minimum difference among a plurality of differences. For instance, a first-layer candidate signal value and its corresponding second-layer candidate signal value can be introduced into Eq. 6 to obtain a difference, and similarly K first-layer candidate signal values and the corresponding K second-layer candidate signal value can be introduced into Eq. 6 to obtain K differences including a minimum difference therein. The first-layer candidate signal value(s), among the existing first-layer candidate signal values, corresponding to the P or the R second-layer candidate signal value(s) is/are the signal value(s) that can be used to reach the said minimum difference. The way to add the first-layer candidate signal value is the same as the way to add the second-layer candidate signal value except the above-described distinction.

Figure 11:
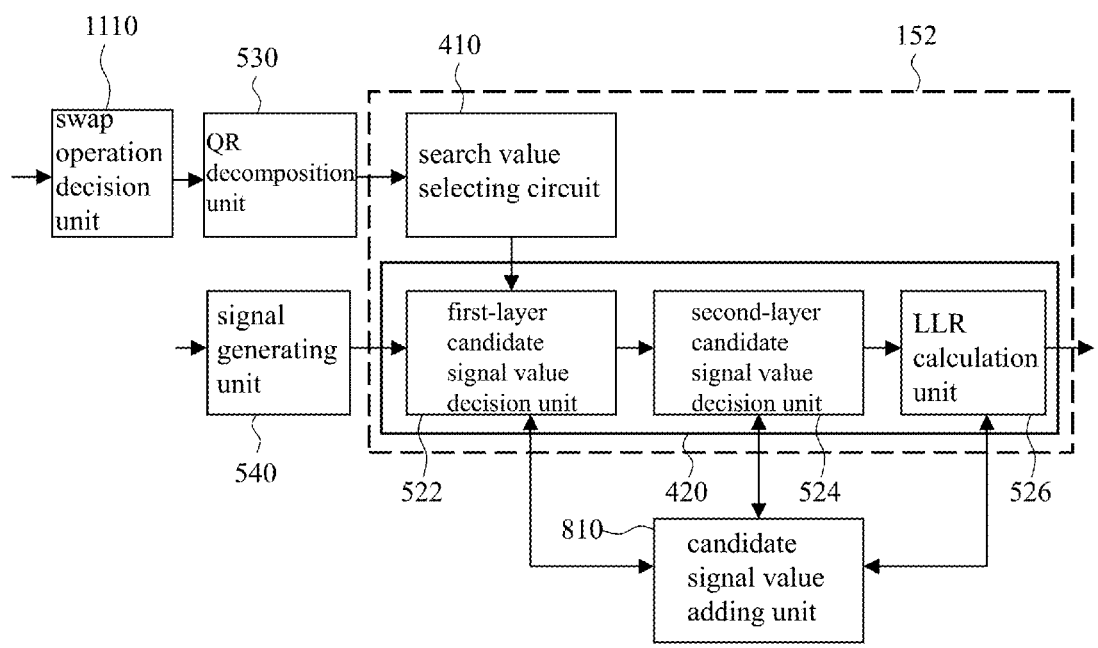
FIG. 11 illustrates an embodiment of the signal detecting circuit of FIG. 4.

Please refer to FIG. 11. The ML detector 152 is operable to execute the reversed operation (which unfolds possible solutions of $\tilde{X}_0$ at the first layer and then unfolds possible solutions of $\tilde{X}_1$ at the second layer) with the aid of a swap operation decision unit 1110. The swap operation decision unit 1110 is operable to determine whether to execute a swap operation according to the channel estimation signal, operable to output the channel estimation signal to the QR decomposition unit 530 when determining not to execute the swap operation, and operable to perform the swap operation to the channel estimation signal when determining to execute the swap operation so as to output a swap signal of the channel estimation signal to the QR decomposition unit 530. More specifically, an embodiment of the swap operation decision unit 1310 determines a priority order of signal detection according to the channel response matrix H of the channel estimation signal; for instance, the swap operation decision unit 1310 determines the priority order according to the energy of the matrix A. In an exemplary implementation, provided that the firstly unfolded signal is $\tilde{X}_u$ ($\tilde{X}_1$ or $\tilde{X}_0$) and the secondly unfolded signal is $\tilde{X}_{\bar{u}}$ ($\tilde{X}_0$ or $\tilde{X}_1$), when the square of the absolute value(s) of the first column in the matrix $\hat{H}$ is less than the square of the absolute value(s) of the second column in the matrix $\hat{H}$ the swap operation decision unit 1310 will exchange the first column of H with the second column of H so as to output the swap signal of the channel estimation signal and thereby make the firstly unfolded signal be $\tilde{X}_0$. When the square of the absolute value(s) of the first column in the matrix $\hat{H}$ is greater than the square of the absolute value(s) of the second column in the matrix $\hat{H}$, the swap operation decision unit 1310 will output the matrix $\hat{H}$ (i.e., the channel estimation signal) and thereby make the firstly unfolded signal be $\tilde{X}_1$. In brief, the swap operation decision unit 1310 is operable to make the signal of lower energy be detected first, so as to make the aforementioned first-layer search value greater and thus decrease the probability of missing some necessary candidate signal value(s). However, if the signal detecting circuit 150 always detects $\tilde{X}_1$ firstly or an equivalent of the signal detecting circuit 150 always detects $\tilde{X}_0$ firstly, the swap operation decision unit 1110 could be omitted.

Figure 12:
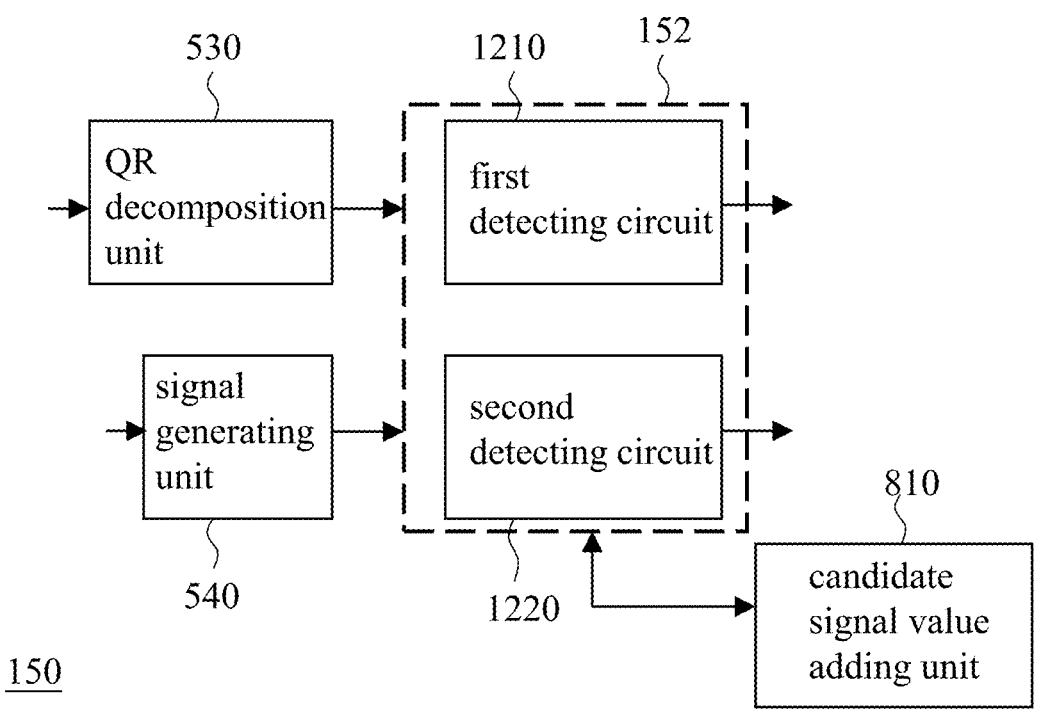
FIG. 12 illustrates an embodiment of the signal detecting circuit of FIG. 4.
Figure 13:
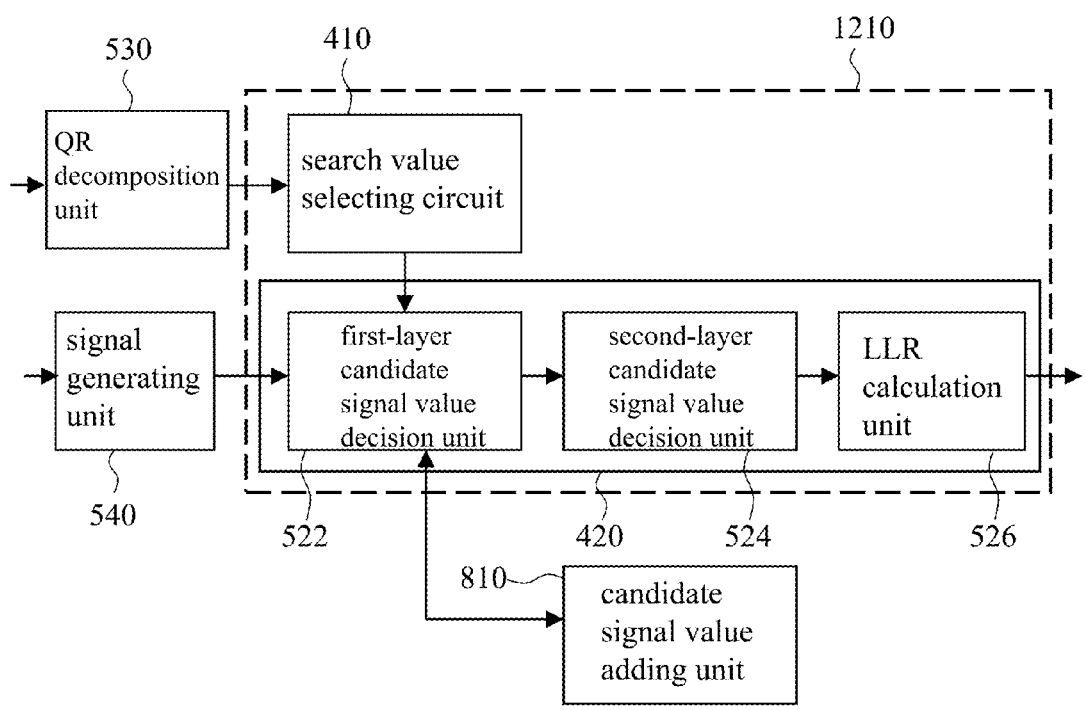
FIG. 13 illustrates an embodiment of the first detecting circuit of FIG. 12.
Figure 14:
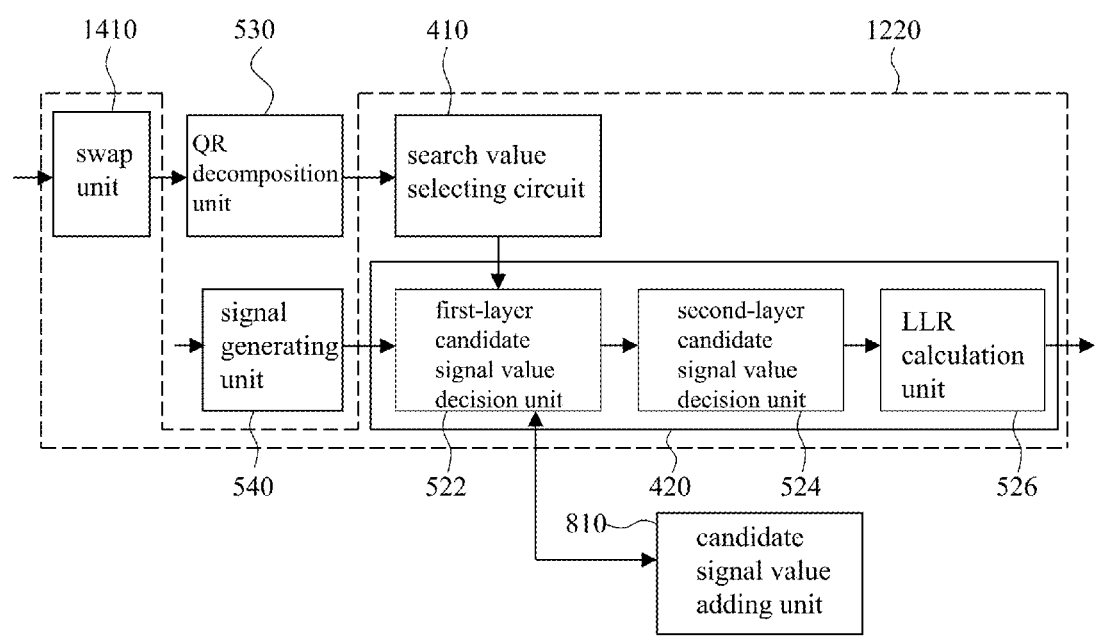
FIG. 14 illustrates an embodiment of the second detecting circuit of FIG. 12.

Please refer to FIG. 12. FIG. 12 illustrates another embodiment of the signal detecting circuit 150. In this embodiment, the signal detecting circuit 150 executes the aforementioned straight operation with a first detecting circuit 1210 and executes the reversed operation with a second detecting circuit 1220. An embodiment of the first detecting circuit 1210 is shown in FIG. 13 and an embodiment of the second detecting circuit 1220 is shown in FIG. 14, in which the candidate signal value adding unit 810 is configured to examine the first-layer candidate signal values $\tilde{X}_u$ of the straight operation and examine the first-layer candidate signal values $\tilde{X}_{\bar{u}}$ of the reversed operation so as to find out whether some candidate signal value(s) is missing in the signal value sets of $\tilde{X}_u$ and $\tilde{X}_{\bar{u}}$ without the need of checking the second-layer candidate signal values. Of course the above-described manner is exemplary rather than restrictive. Please refer to FIG. 14, the swap unit 1410 will exchange the first column of the channel response matrix $\hat{H}$ with the second column of the matrix $\hat{H}$ so as to output the swap signal of the channel estimation signal. It should be noted that the first-layer search value generated by the first detecting circuit 1210 may be equal to or different from the first-layer search value generated by the second detecting circuit 1220. For instance, the first-layer search values generated by the first and second detecting circuits 1210, 1220 respectively are $K_1$, $K_2$, in which each of the $K_1$, $K_2$ is generated according to a communication index.

Since those of ordinary skill in the art can appreciate the detail and modification of the embodiments of FIGS. 12-14 by referring to the explanation of the embodiments described in the preceding paragraphs, repeated and redundant description is omitted without failing the written description and enablement requirements. It should be noted that there is no specific order for executing a plurality of steps in each embodiment of the present disclosure as long as such execution of the steps is practicable; in addition, one step could be composed of multiple sub-steps; these and other features can be found in or derived from the disclosure by those of ordinary skill in the art.

In summary, the present invention is not complicated, and can achieve low latency, low computation complexity, low computation power consumption, small circuit size and no performance loss in comparison with the prior arts.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless signal receiver with a maximum likelihood detector (ML detector), the wireless signal receiver comprising:
    a Discrete Fourier Transform (DFT) circuit configured to convert a time-domain signal into a frequency-domain signal;
    a reference signal extraction circuit configured to generate an extraction reference signal according to the frequency-domain signal;
    a channel estimation circuit configured to generate a channel estimation signal according to the extraction reference signal;
    a data signal extraction circuit configured to generate a reception signal according to the frequency-domain signal;
    the ML detector configured to generate a detection signal according to one of the channel estimation signal and a derivative thereof and according to one of the reception signal and a derivative thereof; and
    a decoding circuit configured to generate a decoded signal according to the detection signal, wherein the ML detector includes:
        a search value selecting circuit configured to determine a first-layer search value; and
        a maximum likelihood detecting circuit (ML detecting circuit) configured to execute at least the following steps:
            selecting K first-layer candidate signal values according to the first-layer search value, one of the reception signal and the derivative thereof, and one of the channel estimation signal and the derivative thereof, in which the K is an integer greater than one;
            determining whether to add Q first-layer candidate signal value(s) according to the K first-layer candidate signal values and thereby generating a first decision result, in which the Q is a positive integer;
            when the first decision result is affirmative, adding the Q first-layer candidate signal value(s), and calculating (K+Q) second-layer candidate signal values according to (K+Q) first-layer candidate signal values composed of the K and the Q first-layer candidate signal values;
            when the first decision result is affirmative, determining whether to add P second-layer candidate signal value(s) according to the (K+Q) second-layer candidate signal values and thereby generating a second decision result, in which the P is a positive integer;
            when the first and the second decision results are affirmative, adding the P second-layer candidate signal value(s), selecting P first-layer candidate signal value(s) according to the P second-layer candidate signal value(s), and calculating log likelihood ratios (LLRs) according to (K+Q+P) first-layer candidate signal values composed of the K, the Q and the P first-layer candidate signal values and according to (K+Q+P) second-layer candidate signal values composed of the (K+Q) the P second-layer candidate signal values;

when the first decision result is affirmative and the second decision result is negative, calculating LLRs according to the (K+Q) first-layer candidate signal values and the (K+Q) second-layer candidate signal values;

when the first decision result is negative, calculating K second-layer candidate signal values according the K first-layer candidate signal values;

when the first decision result is negative, determining whether to add R second-layer candidate signal value(s) according to the K second-layer candidate signal values and thereby generating a third decision result, in which the R is a positive integer;

when the first decision result is negative and the third decision result is affirmative, adding the R second-layer candidate signal value(s), selecting R first-layer candidate signal value(s) according to the R second-layer candidate signal value(s), and calculating LLRs according to (K+R) first-layer candidate signal values composed of the K and the R first-layer candidate signal values and according to (K+R) second-layer candidate signal values composed of the K and the R second-layer candidate signal values; and when the first and the third decision results are negative, calculating LLRs according to the K first-layer candidate signal values and the K second-layer candidate signal values.

2. The ML detector of claim 1, wherein the step of determining whether to add the Q first-layer candidate signal value(s) includes:

determining whether every $n^{th}$ bit value of the K first-layer candidate signal values is identical according to the K first-layer candidate signal values, in which the n is an integer between 0 and (m−1) while the m is a number of bit(s) of each of the K first-layer candidate signal values; and when determining every $n^{th}$ bit value of the K first-layer candidate signal values is identical, adding the Q first-layer candidate signal value(s).

3. The ML detector of claim 1, wherein the step of determining whether to add the P second-layer candidate signal value(s) includes:

determining whether every $n^{th}$ bit value of the (K+Q) second-layer candidate signal values is identical according to the (K+Q) second-layer candidate signal values, in which the n is an integer between 0 and (m−1) while the m is a number of bit(s) of each of the (K+Q) second-layer candidate signal values; and when determining every $n^{th}$ bit value of the (K+Q) second-layer candidate signal values is identical, adding the P second-layer candidate signal value(s).

4. The ML detector of claim 1, wherein the step of determining whether to add the R second-layer candidate signal value(s) includes:

determining whether every $n^{th}$ bit value of the K second-layer candidate signal values is identical according to the K second-layer candidate signal values, in which the n is an integer between 0 and (m−1) while the m is a number of bit(s) of each of the K second-layer candidate signal values; and when determining every $n^{th}$ bit value of the K second-layer candidate signal values is identical, adding the R second-layer candidate signal value(s).

5. The ML detector of claim 1, wherein the step of adding the Q first-layer candidate signal value(s) includes:

selecting a first-layer reference candidate signal value from the K first-layer candidate signal values according to a zero-forcing (ZF) calculation result; and adding the Q first-layer candidate signal value(s) according to the first-layer reference candidate signal value.

6. The ML detector of claim 5, wherein the step of adding the Q first-layer candidate signal value(s) according to the first-layer reference candidate signal value includes: executing a look-up-table operation according to the first-layer reference candidate signal value to access pre-stored data, and thereby adding the Q first-layer candidate signal value(s) according to the pre-stored data.

7. The ML detector of claim 5, wherein the Q is not greater than a number of bit(s) of each of the K first-layer candidate signal values, or on a constellation diagram associated with a modulation type of the reception signal each of the Q first-layer candidate signal value(s) is in a horizontal or vertical direction of the first-layer reference candidate signal value.

8. The ML detector of claim 1, wherein the step of adding the P second-layer candidate signal value(s) and the step of selecting the P first-layer candidate signal value(s) include:

calculating (K+Q) differences according to the (K+Q) first-layer candidate signal values and the (K+Q) second-layer candidate signal values;

selecting a second-layer reference candidate signal value from the (K+Q) second-layer candidate signal values according to the (K+Q) differences, in which the second-layer reference candidate signal value is associated with a first-layer reference candidate signal value among the (K+Q) first-layer candidate signal values;

adding the P second-layer candidate signal value(s) according to the second-layer reference candidate signal value; and making each of the P first-layer candidate signal value(s) equal to the first-layer reference candidate signal value.

9. The ML detector of claim 8, wherein the step of selecting the second-layer reference candidate signal value includes: selecting the second-layer reference candidate signal value from the (K+Q) second-layer candidate signal values according to a minimum of the (K+Q) differences.

10. The ML detector of claim 8, wherein the step of adding the P second-layer candidate signal value(s) according to the second-layer reference candidate signal value includes: executing a look-up-table operation according to the second-layer reference candidate signal value to access pre-stored data, and thereby adding the P second-layer candidate signal value(s) according to the pre-stored data.

11. The ML detector of claim 8, wherein the P is not greater than a number of bit(s) of each of the (K+Q) second-layer candidate signal values, or on a constellation diagram associated with a modulation type of the reception signal each of the P second-layer candidate signal value(s) is in a horizontal or vertical direction of the second-layer reference candidate signal value.

12. The ML detector of claim 1, wherein the step of adding the R second-layer candidate signal value(s) and the step of selecting the R first-layer candidate signal value(s) include:

calculating K differences according to the K first-layer candidate signal values and the K second-layer candidate signal values;

selecting a second-layer reference candidate signal value from the K second-layer candidate signal values according to the K differences, in which the second-layer reference candidate signal value is associated with a first-layer reference candidate signal value among the K first-layer candidate signal values;

adding the R second-layer candidate signal value(s) according to the second-layer reference candidate signal value; and making each of the R first-layer candidate signal value(s) equal to the first-layer reference candidate signal value.

13. The ML detector of claim 12, wherein the step of selecting the second-layer reference candidate signal value includes: selecting the second-layer reference candidate signal value from the K second-layer candidate signal values according to a minimum of the K differences.

14. The ML detector of claim 12, wherein the step of adding the R second-layer candidate signal value(s) according to the second-layer reference candidate signal value includes: executing a look-up-table operation according to the second-layer reference candidate signal value to access pre-stored data, and thereby adding the R second-layer candidate signal value(s) according to the pre-stored data.

15. A wireless signal receiver with a maximum likelihood detector (ML detector), the wireless signal receiver comprising:
   a Discrete Fourier Transform (DFT) circuit configured to convert a time-domain signal into a frequency-domain signal;
   a reference signal extraction circuit configured to generate an extraction reference signal according to the frequency-domain signal;
   a channel estimation circuit configured to generate a channel estimation signal according to the extraction reference signal;
   a data signal extraction circuit configured to generate a reception signal according to the frequency-domain signal;
   the ML detector configured to generate a detection signal according to one of the channel estimation signal and a derivative thereof and according to one of the reception signal and a derivative thereof, the ML detector including:
      a search value selecting circuit configured to determine a first-layer search value; and
      a maximum likelihood detecting circuit (ML detecting circuit) configured to calculate log likelihood ratios (LLRs) according to first-layer candidate values and second-layer candidate values, in which the LLRs are included in the detection signal, the first-layer candidate values are selected according to the first-layer search value, one of the reception signal and the derivative thereof, and one of the channel estimation signal and the derivative thereof, and the second-layer candidate values are calculated according to the first-layer candidate values; and
   a decoding circuit configured to generate a decoded signal according to the detection signal,
   wherein a modulation type of the reception signal is quadrature amplitude modulation with a signal set of size M, and the first-layer search value is an integer less than M.

16. A wireless signal receiver with a maximum likelihood detector (ML detector), the wireless signal receiver comprising:
   a Discrete Fourier Transform (DFT) circuit configured to convert a time-domain signal into a frequency-domain signal;
   a reference signal extraction circuit configured to generate an extraction reference signal according to the frequency-domain signal;
   a channel estimation circuit configured to generate a channel estimation signal according to the extraction reference signal;
   a data signal extraction circuit configured to generate a reception signal according to the frequency-domain signal;
   the ML detector configured to generate a detection signal according to one of the channel estimation signal and a derivative thereof and according to one of the reception signal and a derivative thereof; and
   a decoding circuit configured to generate a decoded signal according to the detection signal,
   wherein the ML detector includes:
      a search value selecting circuit configured to determine a first search value and a second search value; and
      a maximum likelihood detecting circuit (ML detecting circuit) configured to execute at least the following steps:
         selecting $K_1$ first-layer candidate signal values according to the first search value, one of the reception signal and the derivative thereof, and one of the channel estimation signal and the derivative thereof, in which the $K_1$ is an integer greater than one;
         determining whether to add Q first-layer candidate signal value(s) according to the $K_1$ first-layer candidate signal values and thereby generating a first decision result, in which the Q is a positive integer;
         when the first decision result is affirmative, adding the Q first-layer candidate signal value(s), and calculating ($K_1$+Q) second-layer candidate signal values according to ($K_1$+Q) first-layer candidate signal values composed of the $K_1$ and the Q first-layer candidate signal values;
         when the first decision result is affirmative, calculating log likelihood ratios (LLRs) according to the ($K_1$+Q) first-layer candidate signal values and the ($K_1$+Q) second-layer candidate signal values;
         when the first decision result is negative, calculating $K_1$ second-layer candidate signal values according to the $K_1$ first-layer candidate signal values and calculating LLRs according to the $K_1$ first-layer candidate signal values and $K_1$ second-layer candidate signal values;
         selecting $K_2$ first-layer candidate signal values according to the second search value, one of the reception signal and the derivative thereof, and one of a swap signal of the channel estimation signal and a derivative of the swap signal, in which the $K_2$ is an integer greater than one;
         determining whether to add P first-layer candidate signal value(s) according to the $K_2$ first-layer candidate signal values and thereby generating a second decision result, in which the P is a positive integer;
         when the second decision result is affirmative, adding the P first-layer candidate signal value(s), and calculating $(K_2+P)$ second-layer candidate signal values according to $(K_2+P)$ first-layer candidate signal values composed of the $K_2$ and the P first-layer candidate signal values;

when the second decision result is affirmative, calculating LLRs according to the $(K_2+P)$ first-layer candidate signal values and the $(K_2+P)$ second-layer candidate signal values;

when the second decision result is negative, calculating $K_2$ second-layer candidate signal values according to the $K_2$ first-layer candidate signal values and calculating LLRs according to the $K_2$ first-layer candidate signal values and $K_2$ second-layer candidate signal values.

17. The ML detector of claim 16, wherein the step of determining whether to add the Q first-layer candidate signal value(s) includes:

determining whether every $n^{th}$ bit value of the $K_1$ first-layer candidate signal values is identical according to the $K_1$ first-layer candidate signal values, in which the n is an integer between 0 and (m−1) while the m is a number of bit(s) of each of the $K_1$ first-layer candidate signal values; and when determining every $n^{th}$ bit value of the $K_1$ first-layer candidate signal values is identical, adding the Q first-layer candidate signal value(s).

18. The ML detector of claim 16, wherein the step of determining whether to add the P first-layer candidate signal value(s) includes:

determining whether every $n^{th}$ bit value of the $K_2$ first-layer candidate signal values is identical according to the $K_2$ first-layer candidate signal values, in which the n is an integer between 0 and (m−1) while the m is a number of bit(s) of each of the $K_2$ first-layer candidate signal values; and when determining every $n^{th}$ bit value of the $K_2$ first-layer candidate signal values is identical, adding the P first-layer candidate signal value(s).

19. The ML detector of claim 16, wherein the step of adding the Q first-layer candidate signal value(s) includes:

selecting a first-layer reference candidate signal value from the $K_1$ first-layer candidate signal values according to a zero-forcing (ZF) calculation result; and adding the Q first-layer candidate signal value(s) according to the first-layer reference candidate signal value.

20. The ML detector of claim 16, wherein the step of adding the P first-layer candidate signal value(s) includes:

selecting a first-layer reference candidate signal value from the $K_2$ first-layer candidate signal values according to a zero-forcing (ZF) calculation result; and adding the P first-layer candidate signal value(s) according to the first-layer reference candidate signal value.

* * * * *